US006415697B1

(12) United States Patent
Brash et al.

(10) Patent No.: US 6,415,697 B1
(45) Date of Patent: Jul. 9, 2002

(54) ASSEMBLY AND METHODS FOR SLITTING FAT-FREE PRODUCTS

(75) Inventors: Douglas J. Brash, Ramsey; Barrie R. Froseth, Plymouth; S. Ganesh Ganesan, Maple Grove; Loren J. Gordon, Maple Grove; Peter M. Smith, Maple Grove, all of MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 09/207,815

(22) Filed: Dec. 9, 1998

Related U.S. Application Data

(62) Division of application No. 08/772,610, filed on Dec. 23, 1996, now Pat. No. 5,894,775.

(51) Int. Cl.[7] .......................... B26D 7/08; A21C 15/04

(52) U.S. Cl. ............................. 83/13; 83/15; 83/168; 83/171; 83/346; 83/932; 99/355; 99/537; 426/518

(58) Field of Search .......................... 83/16, 171, 932, 83/13, 15, 56, 168, 169, 170, 344, 346, 347, 407, 482, 425.3, 505, 507, 664; 99/355, 537; 165/89; 426/518

(56) References Cited

U.S. PATENT DOCUMENTS

| | | | | |
|---|---|---|---|---|
| 684,764 A | | 10/1901 | Cunningham | 83/171 X |
| 1,383,681 A | * | 7/1921 | Wallburg | 83/170 X |
| 1,779,580 A | | 10/1930 | Baccellieri et al. | 83/505 X |
| 1,996,127 A | | 4/1935 | Stacey | 83/505 X |
| 2,059,790 A | | 11/1936 | Hawkins | 83/168 |
| 2,612,852 A | * | 10/1952 | Morrison | 83/170 X |
| 2,637,395 A | | 5/1953 | Muller | 83/505 X |
| 2,984,276 A | | 5/1961 | Eissmann | 83/168 |
| 3,520,221 A | | 7/1970 | Thomas | 83/664 |
| 3,543,623 A | | 12/1970 | Wirstroem | 83/505 X |
| 4,333,371 A | | 6/1982 | Matsuda | 83/171 X |
| 5,031,497 A | | 7/1991 | Moshier et al. | 83/168 |
| 5,098,366 A | | 3/1992 | Gressman | 83/482 X |
| 5,134,913 A | | 8/1992 | Schroeder | 83/171 X |
| 5,186,959 A | | 2/1993 | Tanaka | 83/171 X |
| 5,235,885 A | | 8/1993 | Camarena et al. | 83/168 X |

FOREIGN PATENT DOCUMENTS

| | | | |
|---|---|---|---|
| DE | 2052361 | 4/1972 | 83/171 |
| DE | 3509117 | 9/1986 | |
| EP | 0635340 | 1/1995 | |
| GB | 1532168 | 11/1978 | |
| SU | 1219036 | 3/1986 | |
| WO | WO9305914 | 4/1993 | |

OTHER PUBLICATIONS

"Crackers Manufactures, Suppliers Partner for Sloutions," Snack Professional, Feb.–Mar., 1995, pp. 36–41.

* cited by examiner

*Primary Examiner*—Clark F. Dexter
(74) *Attorney, Agent, or Firm*—John A. O'Toole; Douglas J. Taylor; Alan D. Kamrath

(57) ABSTRACT

A slitting assembly (10) in the preferred form of a rotary cutter includes a shaft (50) upon which relatively thin, large diameter annular blades (56) are slid and held in place on the shaft by relatively large diameter hubs (60). An axial bore (54) is provided through the shaft (50) for circulating a coolant in fluid communication therewith by rotary joints (74, 78). Thus, the blades (56) are cooled below ambient temperature by conduction through hubs (60) and shaft (50) for imparting continuous longitudinal cuts in a band (12) of fat-free brownie products having an internal temperature higher than ambient. The outer periphery of the blades (56) rotate against a back-up roll (22) rotatable about a parallel axis below the band (12). Scrapers (30, 70) are provided to remove any product sticking to the back-up roll (22) and the axial faces of the blades (56).

20 Claims, 3 Drawing Sheets

ASSEMBLY AND METHODS FOR SLITTING FAT-FREE PRODUCTS

CROSS REFERENCE

This application is a division of application Ser. No. 08/772,610 filed Dec. 23, 1996, now U.S. Pat. No. 5,894,775

BACKGROUND

The present invention generally relates to assemblies for slitting bands into a multiplicity of ribbons, particularly relates to slitting assemblies for baked goods, specifically relates to baked goods slitting assemblies which are not prone to sticking problems, and more specifically relates to slitting assemblies for fat-free food products which are slit when their internal temperatures are above ambient temperatures.

Difficulties are encountered while cutting many types of baked goods and in particular fat-free products as the baked goods and crumbs thereof tend to stick to the cutting blades. Cutting blades having product stuck thereto will not cut in a satisfactory manner and mechanical removal is often not effective. Two approaches have been utilized to overcome this sticking problem, namely lubricating the blade or cooling the blade. In lubricating the blade, an anti-adherent such as an oil or even water is continuously coated on the blade as a means to prevent sticking of product to the blades. This approach has had limited success and is also undesirable as introducing a foreign substance to the baked goods being slit.

Various approaches have been utilized to cool the blades. A first method is to provide cooling of the anvil roll against which the outer peripheries of the rotating blades abut. Although cooling of the anvil roll can be easily accomplished, heat transfer from the blades is limited due to the relatively small area of the conduction path between the blades and the anvil roll. A further method is to provide cooling air flow past the blades. If the blades are cooled to less than about 40° F. (4.5° C.), such air cooling was successful in overcoming sticking problems. However, the system for de-oiling, de-watering, and removing debris such as by filtering the air as well as for moving the air is relatively expensive in capital and operating costs. Another approach is to pack dry ice atop the rotating cutting blades. As the cutter blades were rotated through, the dry ice was contacted against the axial faces of the blades and cooled the same. Again, if the blades are cooled to less than about 40° F. (4.5° C.), such dry ice cooling was successful in overcoming sticking problems. However, handling dry ice is relatively dangerous, and dry ice is expensive so this approach is not very commercially feasible.

Other methods for cutting sticky products exist. However, such other methods, such as the use of water jets which eliminate the need for blades, are expensive and are not as economically feasible in comparison to the use of cutting blades which are moved relative to the product such as by rotation of the blades.

Thus, a need continues to exist for overcoming sticking problems encountered by blades which cut baked goods and especially fat-free products and for overcoming the problems and deficiencies of prior approaches attempting to solve this need.

It is thus an object of the present invention to provide novel methods and assembly for slitting bands into a multiplicity of ribbons.

It is further an object of the present invention to provide such novel slitting methods and assembly especially applicable to bands formed of fat-free food products.

It is further an object of the present invention to provide such novel slitting methods and assembly which do not introduce foreign substances into the band.

It is further an object of the present invention to provide such novel slitting methods and assembly which do not deposit debris upon cutting blades.

It is further an object of the present invention to provide such novel slitting methods and assembly not requiring handling of dry ice or similar low temperature substances.

It is further an object of the present invention to provide such novel slitting methods and assembly having efficient heat transfer from the cutting blades.

It is further an object of the present invention to provide such novel slitting methods and assembly having reduced capital and operation costs.

SUMMARY

Surprisingly, the above objects and other aims can be satisfied in the field of slitting continuous bands into ribbons by providing, in preferred aspects of the present invention, the circulation of a coolant through an internal bore of a cutter for cooling the blades of the cutter by conduction to a temperature which is below ambient temperature for all practical purposes eliminating the band or portions of the band from sticking to the blade as the cutting edge of the blade is moved relative to the hand for cutting the band.

In most preferred aspects of the present invention, the cutter is a rotary cutter having a circular cutting edge rotated about an axis, with the rotary cutter including an axial bore extending between the axial ends of the cutter. Rotary joints in fluid communication with the axial bore receive and return the coolant from a source of coolant. The rotary cutter is formed by annular blades slideably received on a shaft and held in place thereon by hubs also received on the shaft and having axial ends flushly abutting with the axial faces of the blades.

These and further aspects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
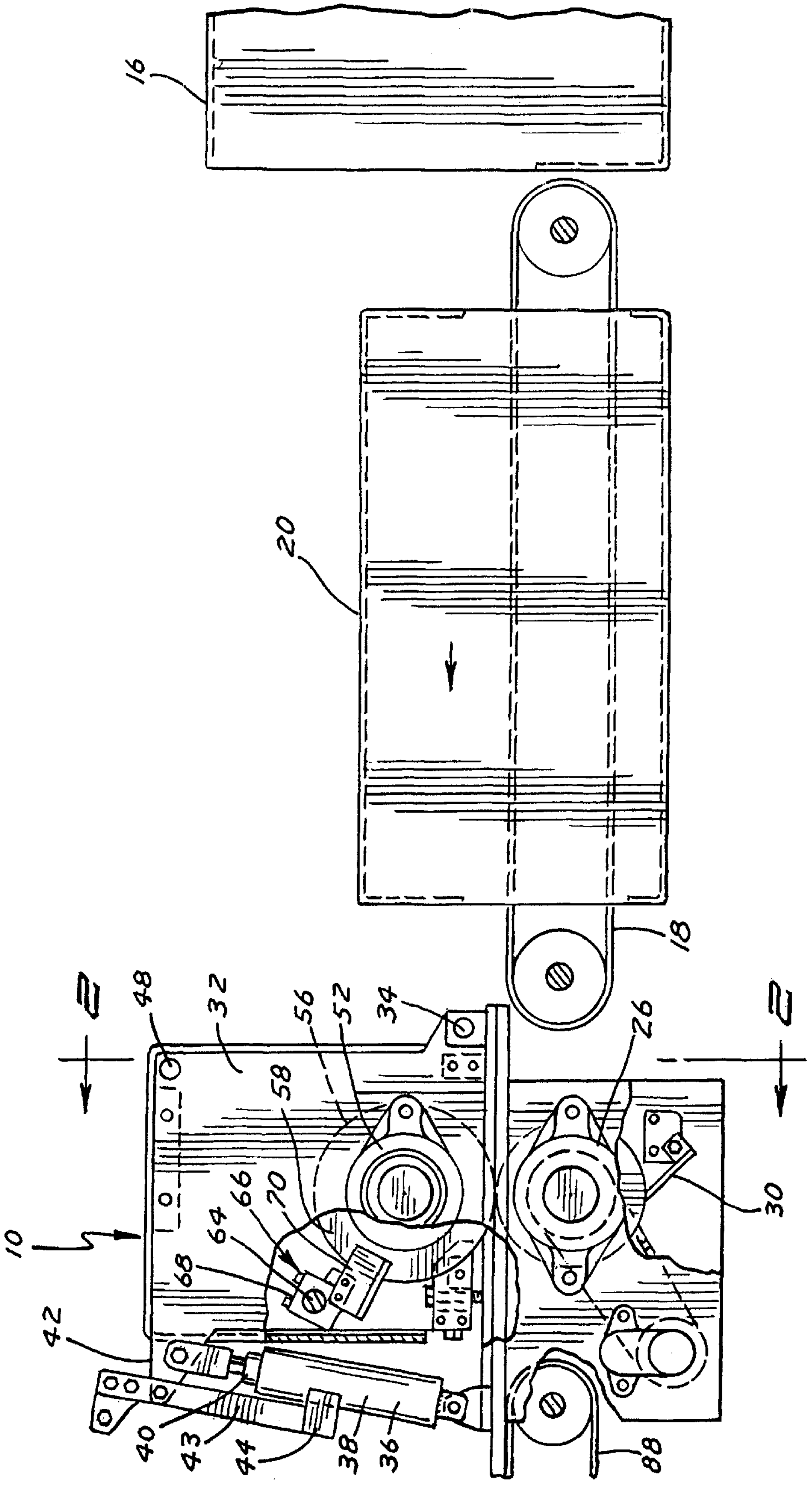
FIG. 1 shows a partially diagrammatic side view of a slitter assembly utilizing the methods of the preferred teachings of the present invention.
Figure 2:
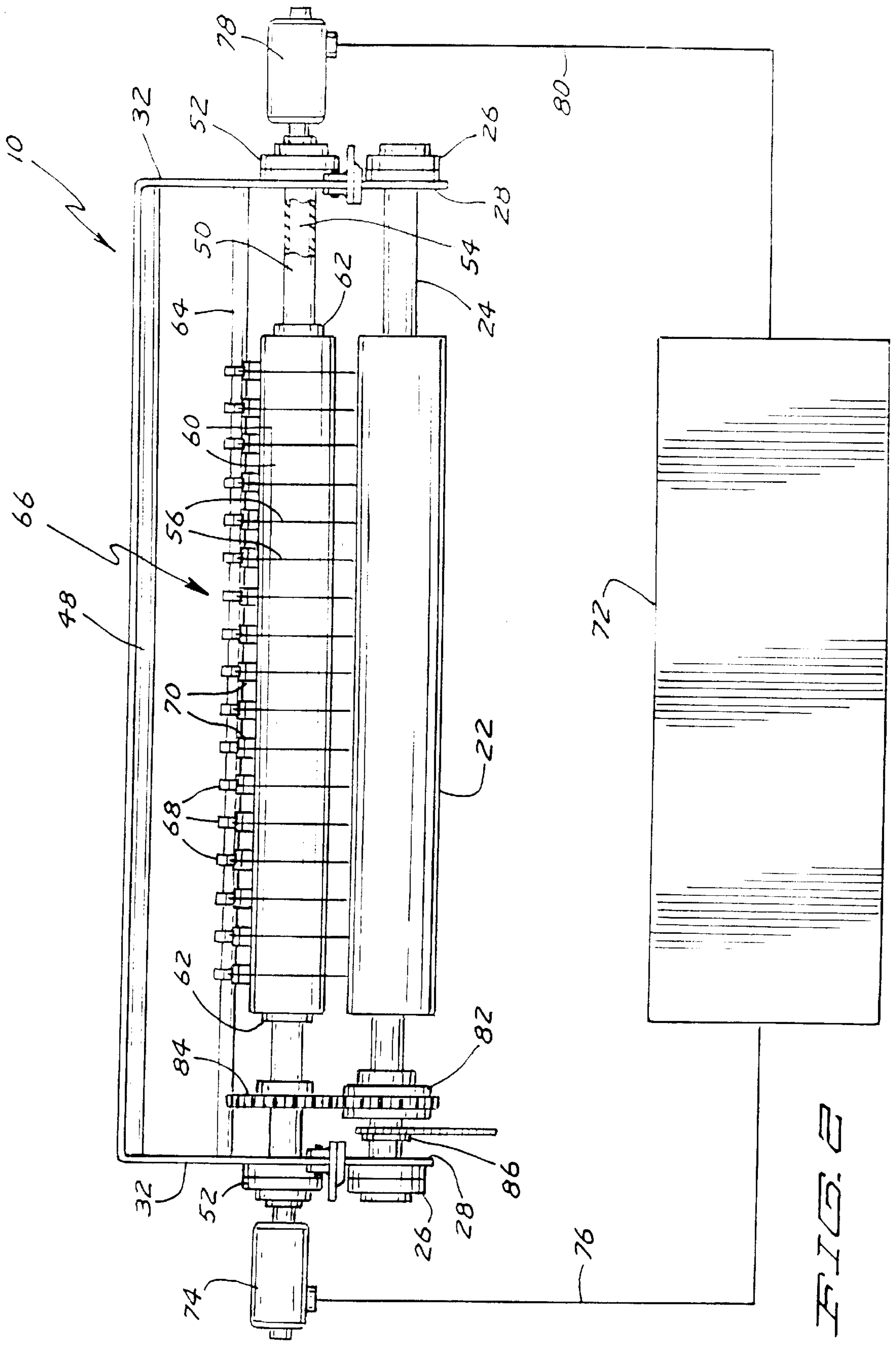
FIG. 2 shows a front view of the slitter assembly of FIG. 1 according to view line 2—2 of FIG. 1.
Figure 3:
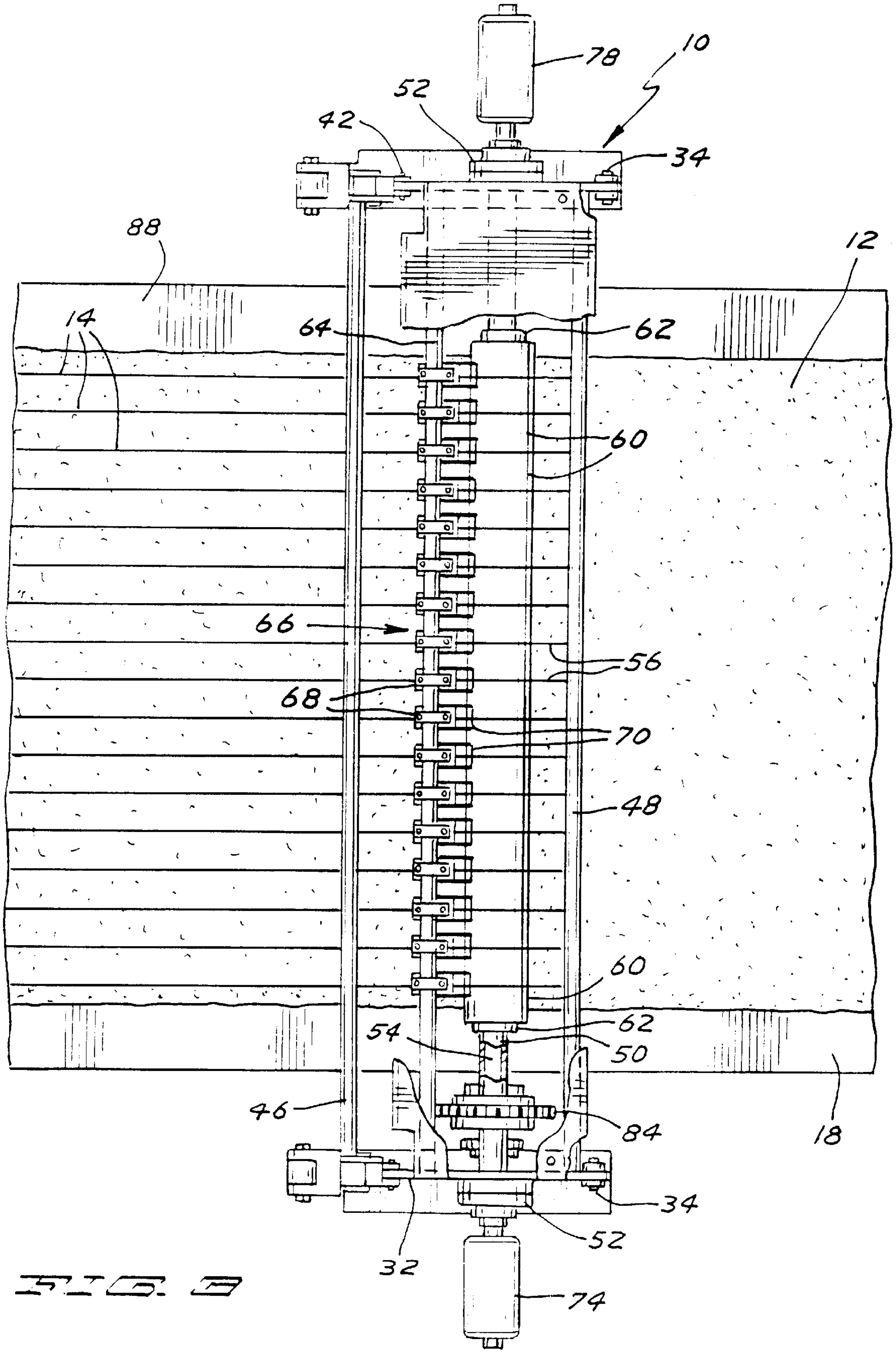
FIG. 3 shows a top view of the slitter assembly of FIG. 1.

All figures are drawn for ease of explanation of the basic teachings of the present invention only; the extensions of the FIGS. with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "inside", "outside", "upper", "lower", "height", "width", "length", "end", "side", "horizontal", "vertical", "axial", "radial", "longitudinal", "lateral", and similar terms are used herein, it should be understood that these terms have reference only to the structure shown in the drawings as it would appear to a person viewing the drawings and are utilized only to facilitate describing the preferred embodiment.

DESCRIPTION

A slitting assembly according to the preferred teachings of the present invention is shown in the drawings and generally designated 10. Slitting assembly 10 cuts a continuous or endless band 12 into a multiplicity of ribbons 14, with ribbons 14 being cut transversely downstream to form individual pieces. In the most preferred form, slitting assembly 10 is utilized to cut a band 12 of baked goods, particularly fat-free products, and in the most preferred form, fat-free brownie products. Specifically, band 12 is produced by a band oven 16 and is conveyed from oven 16 by a suitable conveyor 18 through a cooling tunnel 20 to slitting assembly 10. In the most preferred form, band 12 is approximately 48 inches (120 cm) wide and exits oven 16 with an internal temperature of about 200° F. (93° C.). Band 12 resides in tunnel 20 for about 10 minutes and exits cooling tunnel 20 with an internal temperature of about. 100° F. (38° C.).

Assembly 10 generally includes a back-up roll 22 slideably mounted on a shaft 24 for rotation therewith. Roll 22 has a smooth outer periphery which is concentric to the axis of shaft 24 and an axial length at least equal to and preferably larger than the transverse width of band 12. The free ends of shaft 24 are suitably rotatably mounted such as by bearings 26 to first and second mounting bases 28. Mounting bases 28 are suitably secured in the production apparatus frame. A scraper 30 is provided of a length equal to the axial length of roll 22 and having a free edge for engaging with the smooth outer periphery of roll 22 during its rotation. Scraper 30 mechanically removes any debris which should adhere to the outer periphery of roll 22.

Assembly 10 further includes first and second side plates 32 pivotally mounted to mounting bases 28 about an axis 34 parallel to but spaced from the axis of shaft 24. First and second air cylinders 36 are provided having first ends on cylinder portions 38 pivotally connected to mounting bases 28 and second ends on piston portions 40 pivotally connected to side plates 32 for pivoting side plates 32 relative to mounting bases 28. In the most preferred form, piston portions 40 are pivotally mounted to ears 42 extending from side plates 32. Locking arms 43 are also suitably pivotally mounted to ears 42. To insure that corresponding movement occurs from side to side, a tie rod 46 extends between first and second locking arms 43 and a spacer rod 48 extends between first and second side plates 32. It should then be appreciated that side plate 32 and rods 46 and 48 define a carriage which is pivotal relative to bases 28 about axis 34.

The lower ends of locking arms 43 each include a stop 44 configured to slideably abut with cylinder portions 38 and to slideably receive piston portions 40. Specifically, with cylinders 36 in their retracted position, stops 44 abut with the cylinder portions 38 and slide thereon as cylinders 36 extend. When cylinders 36 have extended a distance such that stops 44 have slid axially past the ends of cylinder portions 38, locking arms 43 will pivot relative to ears 42 with stop 44 moving towards and slideably receiving piston portions 40, with at least portions of stops 44 being axially aligned with the end of cylinder portions 38. It should then be noted that with stops 44 slideably received on piston portions 40, if piston portions 40 were attempted to be retracted into cylinder portions 38, stops 44 would abut with cylinder portions 38. Thus, locking arms 43 prevent side plates 32 from pivoting toward bases 28. When it is desired to pivot side plates 32 toward bases 28, tie rod 46 is grasped and pulled to pivot locking arms 43 relative to ears 42 with stops 44 moving away from cylinders 36. With stops 44 positioned radially outward of cylinder portions 38, piston portions 40 can be retracted into cylinder portions 38. After stops 44 have moved axially beyond the ends of cylinder portions 38, rod 46 can be released allowing locking arms 43 to pivot relative to ears 42 until stops 44 abut with and are slideable upon cylinder portions 38.

A shaft 50 is rotatably mounted such as by bearings 52 to side plates 32 for rotation about an axis which is spaced from and parallel to the axis of shaft 24 and axis 34. In the most preferred form, shaft 50 extends through bearings 52 and includes an axial bore 54 extending between the first and second axial ends of shaft 50 and through the full axial length thereof. A plurality of annular slitter blades 56 are provided each having an inner diameter for slideable receipt on shaft 50 and are keyed for rotation therewith about the axis of shaft 50. Each blade 56 also has a circular outer periphery forming a cutting edge concentric to the axis of shaft 50, with the diameter of the outer peripheries of blades 56 being equal. The diameter of the outer periphery of blades 56 is substantially larger than the diameter of shaft 50 and in the preferred form is over three times larger than the diameter of shaft 50. In the preferred form, each blade 56 includes a bevel 58 on both axial faces extending from the outer periphery towards the center and in the preferred form to a distance of generally three-fourths of the diameter of blades 56. The thickness of blades 56 at the outer periphery between bevels 58 in the most preferred form is generally one-half the thickness of blades 56 radially inside of bevels 58. Blades 56 should have a thickness as thin as possible without buckling, with blades 56 having a thickness radially inside of bevels 58 in the order of 0.042 inch (1.1 mm). Blades 56 should also have non-stick surfaces to resist fouling or sticking. In the most preferred form, blades 56 include a finish in the form of a hardcoat anodize with a polytetrafluoroethylene (sold under the name TEFLON) impregnate.

In the preferred form, blades 56 are held in an axially spaced parallel relation on shaft 50 by hubs 60 which flushly abut on the opposite axial sides of blades 56. Hubs 60 are generally annular in shape having an inner surface of a diameter generally equal to and for slideable receipt on shaft 50 and an outer surface having a diameter substantially greater than shaft 50 but less than the diameter of the outer periphery of blades 56. In the most preferred form, the diameter of the outer surface of hubs 60 is generally double the diameter of shaft 50. In the preferred form, hubs 60 are radially split into two generally C-shaped portions which are secured together by pin connectors extending through one of the C-shaped portions and threaded into the other of the C-shaped portions. Each blade 56 is abutted on opposite axial sides by first and second hubs 60. Hubs 60 have an axial length equal to the axial spacing between blades 56 in the most preferred form, with each of hubs 60 abutting with two blades 56 aside from the axially outer hubs 60 on shaft 50. Bearing lock nuts 62 can be threaded on the opposite axial ends of shaft 50 and abut with the axially outer hubs 60 to prevent sliding of hubs 60 and blades 56 on shaft 50 during operation. It can be appreciated that shaft 50, blades 56, and hubs 60 form a rotary cutter in slitting apparatus 10 of the preferred form of the present invention and all must be formed of the same material to be compatible from an expansion/contraction standpoint and preferably formed of aluminum to maximize heat transfer.

Assembly 10 further includes a scraper support rod 64 extending between side plates 32 parallel to shaft 50 and located radially spaced from blades 56. Associated with each blade 56 is a scraping device or assembly 66. Each scraping assembly 66 includes a mount 68 of a generally annular shape having an inner surface of a diameter generally equal to and for slideable receipt on rod 64. In the preferred form, mount 68 is radially split into two generally U-shaped portions which are secured together by pin connectors extending through one of the U-shaped portions and threaded into the other of the U-shaped portions. In the most preferred form, the free ends of the U-shaped portions forming mount 68 do not abut when secured together with rod 64 extending through the inner surface. Assembly 66 further includes first and second scrapers 70 removably secured to mount 68 having their free edges converging together. Thus, mount 68 can be positioned on rod 64 so that scrapers 70 are located on opposite axial sides of blade 56 with the free edges of scrapers 70 scraping the opposite axial faces of blade 56. It should be appreciated that mount 68 is suitably secured on rod 64 at the desired axial position such as by tightening the pin connectors to prevent movement of assembly 66 during, operation.

Assembly 10 further includes according to the teachings of the present invention a source 72 of a coolant preferably of a food grade such as propylene glycol. However, other forms of refrigerants can be utilized but food grade refrigerants are preferred in the possible event of leakage. Axial bore 54 of one axial end of shaft 50 includes a rotary joints 74 allowing rotation of shaft 50 relative to suitable fluid connections 76 extending between joint 74 and source 72. Axial bore 54 of the other axial end of shaft 50 includes a rotary joint 78 allowing rotation of shaft 50 relative to suitable fluid connectors 80 extending between joint 78 and source 72. Thus, the coolant can be circulated from source 72 through connections 76, joint 74, internally through the rotary cutter through the axial bore 54, joint 78, and connections 80 back to source 72 while the rotary cutter is being rotated within bearings 52.

Back-up roll 22 is rotatable with the rotary cutter such as by a gear 82 on shaft 24 in gearing relation with a gear 84 on shaft 50. Back-up roll 22 and the rotary cutter can be driven by any suitable drive means such as by a roller chain drive 86.

Now that the basic construction of slitting assembly 10 according to the teachings of the present invention has been set forth, the operation of slitting assembly 10 can be explained and some of the advantages obtained thereby can be highlighted. Specifically, band 12 produced by oven 16 is conveyed by conveyor 18 to slitting assembly 10. With side plates 32 being in position relative to bases 28 such that the outer periphery of blades 56 engage with the outer periphery of roll 22, band 12 passing through slitting assembly 10 will be cut by the rotation of blades 56 imparting longitudinally extending continuous cuts in band 12 and thereby dividing band 12 into a multiplicity of ribbons 14. Ribbons 14 pass from slitting assembly 10 onto a further conveyor 88 for movement to stations downstream of assembly 10 including but not limited to transverse cutting mechanisms, piece wrappers, and cartoning machines. In the preferred form, band 12 moves on conveyor 18 and through assembly 10 at a rate of about 6 feet (2 meters) per minute. Shafts 24 and 50 can be suitably driven such that the speed at the outer peripheries of blades 56 extending through band 12 and at their abutment with roll 22 is equal to, less than, or greater than the rate at which band 12 advances on conveyor 18. However, in the most preferred form when band 12 is in the form of a fat-free brownie product, the speed of blades 56 is approximately equal to the rate at which band 12 advances, with speeds either less than or greater than the rate at which band 12 advances resulting in undesirable shearing or tearing of band 12. It should be appreciated that the speed of the outer periphery of blade 56 depends upon the diameter of blades 56 and the rotational speed of shaft 50. It has been found for best results that blades 56 of a larger diameter rotating at slower rotational speeds are more desirable than blades 56 of a smaller diameter rotating at higher rotational speeds. In the preferred form, blades 56 having a diameter in the order of nine times the thickness of band 12 are utilized, and in the most preferred form, blades 56 having a diameter of 8¹⁄₁₆ inches (20.5 cm) are utilized.

It should be realized that due to the abutment of ribbons 14 with the opposite axial faces of blades 56 and with band 12 being at greater than ambient temperatures, blades 56 tend to be heated by band 12. It has been recognized that crumbs of band 12 will tend to stick to blades 56 and ribbons 14 tend to ball up. Once started, the sticking problem very quickly cascades or snowballs into a major problem. One way to reduce sticking problems would be to utilize longer cooling tunnels 20 or by slowing the speed of conveyor 18 so that longer time is spent within cooling tunnel 20. However, these are not very economical as operation of cooling tunnels 20 is relatively expensive.

Assembly 10 according to the teachings of the present invention circulates coolant chilled to a temperature of approximately −20° F. (−29° C.) through axial bore 54. Thus, through simple conduction, blades 56 are maintained at a temperature below ambient and in the most preferred form at about 40° F. (4.5° C.) when cutting band 12 having an internal temperature of about 100° F. (38° C.). It has been found that cooling of blades 56 is effective in overcoming problems of band 12 or portions and crumbs thereof from sticking to blades 56 and especially for bands 12 formed of fat-free brownie products.

It should be noted that the construction of assembly 10 of the preferred form of the present invention produces synergistic cooling of blades 56 according to the teachings of the present invention. In particular, the abutment of the inner surfaces of hubs 60 with shaft 50 provides a good conduction path of substantial area therebetween. Further, due to the relatively large outer diameter of hubs 60, hubs 60 provide a large mass acting as a heat sink for blades 56. But equally important, the axially opposite ends of hubs 60 flushly abut with the axial faces of blades 56 providing a good conduction path of substantial area therebetween. Furthermore, due to the thinness of blades 56, heat is quickly transferred through blades 56 to hubs 60 for transference to shaft 50 and the coolant located in axial bore 54. Thus, cooling of blades 56 by conduction is advantageously obtained according to the teachings of the present invention.

It should be appreciated that assembly 10 according to the teachings of the present invention is more effective in overcoming blade sticking problems than prior blade lubrication approaches and does not require the introduction of a foreign substance such as an anti-adherent onto band 12. Thus, assembly 10 overcomes the deficiencies of prior blade lubricating approaches.

It should also be appreciated that as the coolant is circulated through shaft 50, problems of debris deposited from the coolant are avoided. Specifically, cooling air circulated around blades 56 can carry oil and other unwanted substances which can be deposited on blades 56. Likewise, blades 56 rotating through a dry ice or similar low temperature substance bath may not be completely wiped clean of the bath substance but the bath substance may remain deposited on blades 56. Any such debris on the blades 56 may be wiped off and onto band 12, which is clearly undesired. Also, the coolant is continuously recirculated and is not consumed and thus does not need to be replenished such as would be in the case of dry ice and does not need to be refurbished as in the case of circulating air. Further, problems of handling dry ice or similar low temperature substances are not encountered with slitting assembly 10 according to the teachings of the present invention. Also, heat transfer is more efficient to a liquid coolant than to air so that both capital and operation costs are less for assembly 10 according to the teachings of the present invention. Thus, assembly 10 overcomes these and other deficiencies of prior blade cooling approaches.

Side plates 32 can be pivoted relative to mounting bases 28 to change the spacing between the axes of shafts 24 and 50 and specifically to space the periphery cutting edges of blades 56 from the outer periphery of roll 22. Thus, servicing of assembly 10 according to the teachings of the present invention can be relatively easily accomplished. Additionally, adjustment of the positioning of shaft 50 in plates 32 can be easily accomplished when blades 56 are spaced from roll 22, with air cylinders 36 being retracted to pivot plates 32 to engage blades 56 with roll 22 at desired pressures according to the positioning of shafts 24 and 50 relative to each other. Further, to prevent plates 32 from pivoting relative to bases 28 and thus shaft 50 relative to shaft 24 when servicing assembly 10 with blades 56 spaced from roll 22, cylinders 36 can be extended sufficiently to pivot locking levers 43 relative to ears 42 such that stops 44 abut with the ends of cylinder portions 38 and thereby prevent the unintentional retraction of cylinders 36.

Although slitting assembly 10 of the most preferred form has been explained in connection with imparting continuous longitudinal cuts in fat-free products and is believed to have advantageous application thereto, slitting assembly 10 according to the teachings of the present invention can be utilized for cutting various confections and baked goods as well as chewy granola bars, fruit products, various bakery products, rice breakfast cereal bars, popcorn bars, and the like.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Method for slitting a band of edible baked goods into a plurality of ribbons, with the band of edible baked goods having an internal temperature greater than ambient temperature, comprising: providing a cutter having at least one cutting edge; conveying the band of edible baked goods from an oven from an upstream point to a downstream point; engaging and cutting the band of edible baked goods with the cutting edge of the cutter intermediate the upstream and downstream points as the band of edible baked goods is being conversed from the upstream point to the downstream point, and circulating a coolant internally through the cutter for cooling the cutter, by conduction to a cutter temperature below said ambient temperature for generally eliminating the band of edible baked goods or portions thereof from sticking to the cutter.

2. The method of claim 1 wherein said circulating the coolant comprises circulating the coolant having a coolant temperature below the cutter temperature.

3. The method of claim 2 wherein said engaging and cutting the band comprises rotating the cutter about an axis, with the cutting edge being circular and concentric to the axis of the cutter, with the cutter including first and second axial ends and an axial bore extending between the first and second axial ends; and wherein said circulating the coolant comprises circulating the coolant from a source into the first axial end of the axial bore, through the axial bore and out the second axial end of the axial bore back to the source.

4. The method of claim 3 further comprising rotating a back-up roll about an axis parallel to and spaced from the axis of the cutter, with the back-up roll having an outer periphery for rotatably abutting with the cutting edge of the cutter.

5. The method of claim 4 further comprising scraping the outer periphery of the back-up roll spaced from where the cutting edge rotatably abuts with the outer periphery of the back-up roll.

6. The method of claim 2 wherein said providing the cutter comprises providing the cutter including at least one blade having the cutting edge and first and second axial faces; and wherein the method further comprises [the step of]: scraping both the first and second axial faces of the blade.

7. The method of claim 6 wherein said providing the cutter comprises: providing the cutter including a shaft, with the axial bore extending through the shaft, with the blade being annular, located on the shafts, and including first and second axial faces; and flushly abutting an axial end of first and second hubs with the first and second axial faces of the blade for holding the blade on the shaft, with the first and second hubs providing a heat sink for the blade, with the blade being cooled by conduction through the first and second hubs and the shaft.

8. The method of claim 3 wherein said rotating the cutter comprises rotating the cutter so that the speed of the cutting edge is approximately equal to a conveying speed of the band of edible baked goods.

9. The method of claim 8 wherein said conveying the band of edible baked goods comprises conveying the band of edible baked goods having a thickness and at a conveying speed; and wherein said rotating the cutter comprises rotating the cutter where the circular cutting edge has a diameter on the order of nine times the thickness of the band of edible baked goods to allow rotation of the cutter at slower rotational speeds.

10. The method of claim 9 wherein said providing the cutter includes providing a shaft, an annular blade on the shaft having a circular outer periphery forming the circular cutting edge, and first and second axial faces; and abutting an axial end of first and second hubs with the first and second axial faces of the blade for holding the blade on the shaft, with the hubs having outer surfaces of a diameter generally double the diameter of the shaft.

11. The method of claim 8 further comprising: rotating a back-up roll about an axis parallel to and spaced from the axis of the cutter, with the back-up roll having an outer periphery for rotatably abutting with the cutting edge of the cutter.

12. The method of claim 8 wherein said providing the cutter comprises providing the cutter including at least one blade having the cutting edge and first and second axial faces; and wherein the method further comprises: scraping the first and second axial faces of the blade.

13. The method of claim 8 wherein said providing the cutter comprises providing the cutter including at least one blade having the cutting edge and first and second axial faces, with the axial faces including non-stick surfaces to resist fouling or sticking.

14. The method of claim 1 wherein said conveying the band of edible baked goods from the oven includes passing the band of edible baked goods through a cooling tunnel prior to said cutting and engaging the band.

15. Method for slitting a band of edible baked goods into a plurality of ribbons, with the band having an internal temperature greater than ambient temperature, comprising the steps of: providing a rotary cutter including a shaft, an annular blade having a cutting edge at a circular outer periphery thereof, an inner diameter for slideable receipt on the shaft and first and second axial faces; sliding the blade on the shaft; abutting an axial end of first and second hubs with the first and second axial faces of the blade for holding the blade on the shaft, with the hubs having outer surfaces of a diameter generally double the diameter of the shaft; conveying the band from an oven to the rotary cutter at a conveying speed, with the band having a thickness; rotating the rotary cutter so that the cutting edge engages and cuts the band, with the speed of the circular outer periphery being approximately equal to the conveying speed, with the circular outer periphery being on the order of nine times the thickness of the band to allow rotation of the rotary cutter at slower rotational speeds; and circulating a coolant internally through the rotary cutter for cooling the cutter by conduction to a cutter temperature below ambient temperature for generally eliminating the band or portions thereof from sticking to the rotary cutter.

16. The method of claim 15 wherein the providing step comprises the step of providing the rotary cutter with the circular outer periphery being over three times larger than the diameter of the shaft.

17. The method of claim 16 wherein the providing step further comprises the step of providing the rotary cutter with the axial sides of the blade being beveled extending from the outer periphery a distance generally three-fourths of the diameter of the circular outer periphery of the blades.

18. The method of claim 17 wherein the providing step further comprises the step of providing the rotary cutter with the blade having a thickness at the circular outer periphery generally equal to one half the thickness at the inner diameter.

19. The method of claim 15 wherein the providing step comprises the step of providing the rotary cutter with the axial sides of the blade including non-stick surfaces to resist fouling or sticking.

20. The method of claim 19 wherein the providing step further comprises the step of providing the rotary cutter with the non-stick surfaces being finished with a hardcoat anodize with a polytetrafluoroethylene impregnate.

* * * * *